(12) United States Patent
Cox

(10) Patent No.: US 11,572,008 B2
(45) Date of Patent: Feb. 7, 2023

(54) TIE-DOWN APPARATUS FOR SECURING CARGO ON A CARRIER VEHICLE

(71) Applicant: Benjamin Cox, Dayton, ID (US)

(72) Inventor: Benjamin Cox, Dayton, ID (US)

( * ) Notice: Subject to any disclaimer, the term of this patent is extended or adjusted under 35 U.S.C. 154(b) by 226 days.

(21) Appl. No.: 17/186,725

(22) Filed: Feb. 26, 2021

(65) Prior Publication Data

US 2021/0178957 A1    Jun. 17, 2021

(51) Int. Cl.
*B60P 7/08* (2006.01)

(52) U.S. Cl.
CPC ............ *B60P 7/083* (2013.01); *B60P 7/0846* (2013.01)

(58) Field of Classification Search
CPC .......... B60P 7/083; B60P 7/0846; B60P 3/079
See application file for complete search history.

(56) References Cited

U.S. PATENT DOCUMENTS

| | | | | |
|---|---|---|---|---|
| 5,920,963 A * | 7/1999 | Chou | .................... | F16G 11/106 24/191 |
| 7,004,695 B1 * | 2/2006 | Wen-Hsiang | ......... | B60P 7/0823 410/23 |
| 8,973,884 B1 * | 3/2015 | Stuckey | ............... | B60N 2/2887 24/68 CD |
| 9,914,385 B1 * | 3/2018 | Stuckey | ............... | A44B 11/065 |
| 11,470,921 B2 * | 10/2022 | Hurley | ............... | B65H 75/4492 |
| 2007/0189873 A1 * | 8/2007 | Breeden | .................. | B60P 7/083 410/100 |
| 2009/0047091 A1 * | 2/2009 | Huck | ...................... | B60P 7/083 24/68 CD |
| 2009/0119892 A1 * | 5/2009 | Breeden | .................. | B60P 7/083 24/68 CD |
| 2011/0209315 A1 * | 9/2011 | Miller | ..................... | B60P 7/083 24/68 CD |
| 2013/0104354 A1 * | 5/2013 | Miller | ..................... | B60P 7/083 24/68 CD |
| 2013/0326848 A1 * | 12/2013 | Strahl | .................... | B60P 7/0823 24/69 ST |
| 2014/0000073 A1 * | 1/2014 | Hortnagl | ................. | B60P 7/083 24/70 ST |
| 2014/0061556 A1 * | 3/2014 | Knox | .................... | B60P 7/0846 254/220 |
| 2015/0224912 A1 * | 8/2015 | Brown | .................... | B60P 7/083 242/395 |
| 2020/0017016 A1 * | 1/2020 | Christie | ................... | D04C 1/02 |

\* cited by examiner

*Primary Examiner* — David M Upchurch
(74) *Attorney, Agent, or Firm* — Barry Choobin; Patent 360

(57) ABSTRACT

An apparatus for securing cargo to a flatbed of a carrier vehicle. The apparatus includes two pulley blocks, the first pulley block and the second pulley block. The first pulley block having a proximal end and a distal end, the distal end having two pulleys arranged side-by-side. The second pulley block having a proximal end and a distal end, the distal end of the second pulley having two pulleys arranged side-by-side. A first strap having a first end coupled to a first hook and the second end is coupled to a proximal end of the first pulley block. A second strap having a second hook at one end and the other end can be inserted into the second block pulley through its proximal end. The free end loops around the pulleys of the two pulley blocks and exits from the first pulley block. The free end of the second strap is having a handle.

10 Claims, 2 Drawing Sheets

TIE-DOWN APPARATUS FOR SECURING CARGO ON A CARRIER VEHICLE

FIELD OF THE INVENTION

The present invention relates to a tie-down apparatus, and more particularly the present invention relates to a tie-down apparatus having a mechanical advantage for securing cargo on a flatbed of a carrier vehicle.

BACKGROUND

Small vehicles, such as motorcycles, snowmobiles, motor sled, and like are transported on a bed of a carrier vehicle, such as a truck or trailer. Transporting voluminous cargo on a truck's or trailer's flatbed is a known commercial practice. Keeping the cargo stationary on the carrier vehicle's bed is important for the safety of the cargo as well as safe driving. Loose cargo can move around during transit and get damaged or make driving difficult. The cargo, including the small vehicles, are generally tied down to the carrier vehicle's flatbed using retainers, such as cables, webbings, chains, or straps. The carrier vehicle's flatbed can have hooks, apertures, and like for fastening the retainers. To keep the cargo stationary, the retainers should be subjected to sufficient tension, which requires a lot of force. Additionally, more than one person may be needed to secure the cargo on the carrier vehicle's bed. Despite all the laborious efforts, the straps may not be tightly secured to keep the cargo stationary, thus increasing the risk of damage to the cargo.

Winches are known to be used in carrier vehicles for securing cargo. However, the winches are costly and are permanently coupled to the carrier vehicle's bed. Additionally, the use of winches may not be feasible with certain carrier vehicle or cargos. Therefore, a long-term desire is there for an apparatus that can secure cargo on a carrier vehicle's bed with fewer efforts and quickly.

SUMMARY OF THE PRESENT INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a tie-down apparatus with a mechanical advantage.

It is another object of the present invention that the tie-down apparatus can secure cargo on a flatbed.

It is still another object of the present invention that the tie-down apparatus is portable.

It is yet another object of the present invention that the tie-down apparatus is economical to manufacture.

It is a further object of the present invention that the tie-down apparatus is compact for storage and transport.

In one aspect, disclosed is a tie-down apparatus for securing cargo to a flatbed of a carrier vehicle. The tie-down apparatus includes two pulley blocks, the first pulley block and the second pulley block. The first pulley block having a proximal end and a distal end, the distal end having one or two pulleys arranged side-by-side. The second pulley block having a proximal end and a distal end, the distal end of the second pulley having one or two pulleys arranged side-by-side. A first strap having a first end coupled to a first hook and the second end is coupled to the proximal end of the first pulley block. A second strap having a second hook at one end and the other end can be inserted into the second block pulley through its proximal end. The free end loops around the pulleys of the first pulley block and the second pulley block that provides the mechanical advantage, and the free end can exit from the proximal end of the first pulley. The free end of the second strap is having a handle.

In one aspect, the disclosed tie-down apparatus can secure the cargo on a flatbed, wherein the first hook and the second hook can be hooked to the flatbed, and the two straps of the tie-down apparatus pass over the cargo. The free end of the second strap having the handle can then be pulled to tighten the tie-down apparatus.

These and other objects and advantages of the embodiments herein will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
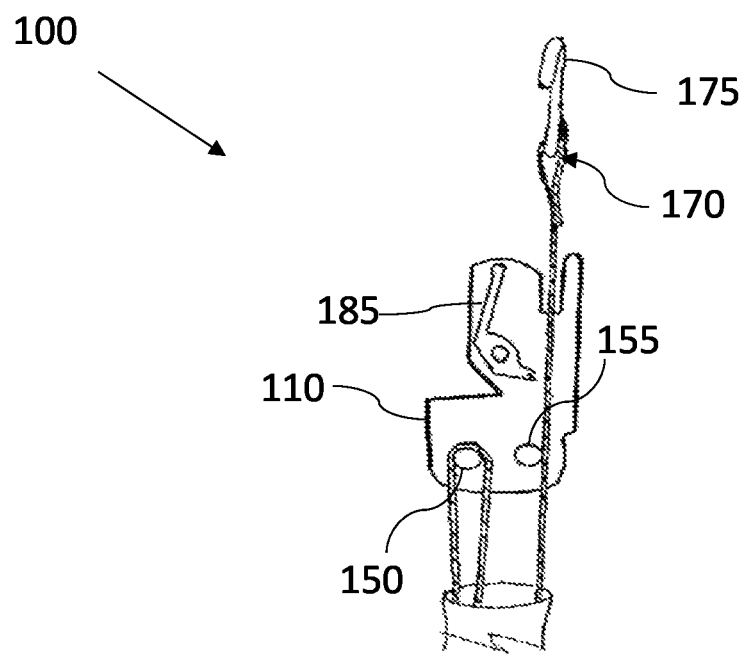
FIG. 1 shows the disclosed tie-down apparatus having a first strap, a second strap, a first pulley block, and a second block, wherein the sectional views of the two pulley blocks are shown, according to an exemplary embodiment of the present invention.
Figure 1:
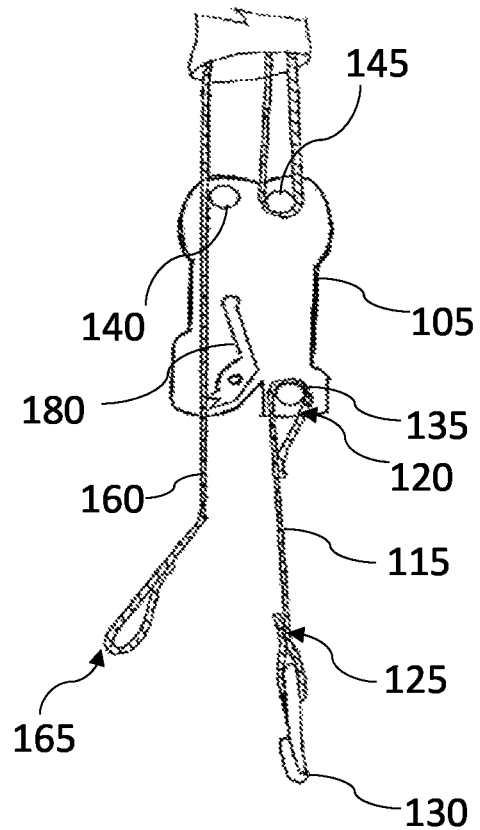

Disclosed is a tie-down apparatus for securing cargo in a carrier vehicle, wherein the tie-down apparatus is having a mechanical advantage for subjecting the tie-down apparatus to desired tension. Referring to FIG. 1 which shows an exemplary embodiment of the disclosed apparatus. Apparatus 100 having a first pulley block 105 and a second pulley block 110. Each of the first pulley block 105 and the second pulley block 110 having a proximal end and a distal end. A first strap 115 is having a first end 120 and a second end 125. The first end 120 of the first strap is coupled to the proximal end of the first pulley block 105. The first pulley block 105 is having a pin 135 to which the first end 120 of the first strap 115 can couple. The second end of the first strap 115 is having a hook 130.

The distal end of the first pulley block 105 is having a pair of pulleys 140 and 145 arranged side-by-side and spaced apart. Similarly, the distal end of the second pulley block 110 is having two pulleys 150 and 155 that are also arranged side-by-side and spaced apart. A second strap 160 is having a first end 165 and an opposite second end 170. The first end 165 of the second strap 160 is having a handle in the form of a loop. The first end 165 is free, which can be grabbed by a hand and pulled. The second end 170 is coupled to a hook 175. The free end 165 of the second strap 160 can enter into the second pulley block 110 through its proximal end. The first end goes over the pulley 145 and further loops around pulley 150 and exits from the proximal end of the first pulley block 105.

The second strap can loop around the pulleys of the two pulley-blocks for the desired mechanical advantage. The mechanical advantage is based on the number of pulleys and turns of the second strap around these pulleys. More, the number of loops is between the first pulley block and the second pulley block, more is the mechanical advantage and lesser force is required for the desired tension in the apparatus 100. FIG. 1 shows two pulleys in each pulley block, however, one and more than two pulleys are within the scope of the present invention. For the desired tension in the disclosed apparatus, the force required is inversely proportional to the loops of the second apparatus around the number of pulleys. More is the loops around the pulleys more is the mechanical advantage.

The first pulley block 105 is having a first rachet 180 and the second pulley block 110 is having a second rachet 185. Both the rachets can be switched between an engaged position and a disengaged position. By default, both rachets are biased in the engaged position. The rachets in the engaged position permit one-way movement of the second strap i.e., the free end 165 can be pulled away from the pulley block, but the reverse retraction of the free end 165 is restricted by the rachets. To pull the second end 170 of the second strap 160, away from the second pulley block 110, both the ratchets have to be disengaged. A clip can be provided in each pulley block that allows disengaging the ratchets by pressing with a finger of thumb.

Figure 2:
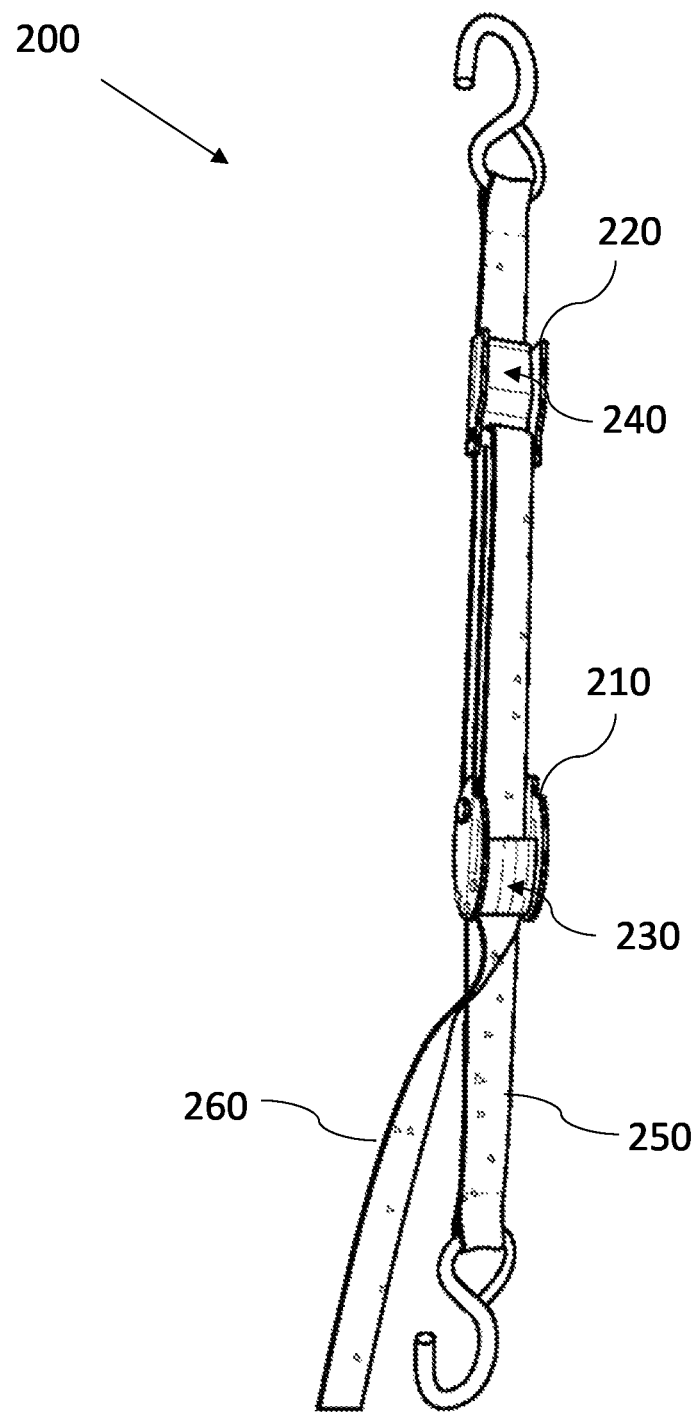
FIG. 2 shows an exemplary embodiment of the tie-down apparatus, according to an exemplary embodiment of the present invention.

Referring to FIG. 2, which shows an exemplary embodiment of the apparatus 200 having a first pulley block 210 and a second pulley block 220. The first pulley block having a clip 230 that can be pressed using a finger or thumb to disengage the rachet. Similarly, the second pulley block is having a clip 240 that can be pressed using a finger or thumb to disengage the rachet. The first strap 250 is fixedly coupled to the first pulley block 210. The second strap 260 enters the second pulley block 220, loops around the pulleys, and exits from the first pulley block 210.

To secure cargo on a flatbed of a carrier vehicle, the second end 170 of the second strap 160 can be hooked to the flatbed through the hook 175. Thereafter, while holding both the pulley blocks in each hand and the ratchets switched in the disengaged position, by pressing the clips of the pulley block, the tie-down apparatus can cross over the cargo. When the hook 130 of the first strap 115 is within the reach of the fastening aperture, the two rachets can be released, and the hook 130 can then be hooked to the fastening aperture. The second strap can then be tightened by pulling the free end 165 of the second strap 160. To loosen the disclosed tie-down apparatus, the ratchets can be switched to the disengaged state which retracts the free end 165 of the second strap 160.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An apparatus for securing a cargo on a carrier vehicle, the apparatus comprising:
    a first pulley block having a proximal end and a distal end, the distal end of the first pulley block having at least one pulley;
    a second pulley block having a proximal end and a distal end, the distal end of the second pulley block having at least one pulley;
    a first strap having a first end and opposite second end, the first end is coupled to a first hook, the second end is coupled to the proximal end of the first pulley block; and
    a second strap having a first end and a second end, the first end of the second strap is coupled to a second hook, the second end is received into the second pulley block which loops around at least one pulley of the at least one pulleys of the first pulley block and thereafter loops around at least one pulley of the at least one pulleys of the second pulley block and exits through the first pulley block.

2. The apparatus according to claim 1, wherein the second end of the second strap is configured as a handle.

3. The apparatus according to 1, wherein each the first pulley block and the second pulley block have two pulleys.

4. The apparatus according to claim 1, wherein the first pulley block is having a first rachet, the first rachet configured to switch between an engaged position and a disengaged position, in the engaged position the first ratchet limits the movement of the second strap in one direction that is pulling of the second end of the second strap away from the first pulley block.

5. The apparatus according to claim 4, wherein the second pulley block is having a second rachet, the second rachet configured to switch between an engaged position and a disengaged position, in the engaged position the second ratchet limits the movement of the second strap in one direction that is pulling of the second end of the second strap away from the first pulley block.

6. The apparatus according to claim 5, wherein the first ratchet and the second rather are by default biased in the engaged position.

7. The apparatus according to claim 6, wherein each the first pulley block and the second pulley blocks having a clip which is actuable to disengage the first ratchet and the second ratchet respectively.

8. A method for securing a cargo on a carrier vehicle, the method comprising the step of:
- providing an apparatus, the apparatus comprises:
  - a first pulley block having a proximal end and a distal end, the distal end of the first pulley block having at least one pulleys;
  - a second pulley block having a proximal end and a distal end, the distal end of the second pulley block having at least one pulleys;
  - a first strap having a first end and an opposite second end, the first end is coupled to a first hook, the second end is coupled to the proximal end of the first pulley block;
  - a second strap having a first end and a second end, the first end of the second strap is coupled to a second hook, the second end is received into the second pulley block which loops around at least one pulley of the at least one pulleys of the first pulley block and thereafter loops around at least one pulley of the at least one pulleys of the second pulley block and exits through the first pulley block;
  - the first pulley block is having a first rachet, the first rachet configured to switch between an engaged position and a disengaged position, in the engaged position, the first ratchet limits the movement of the second strap in one direction that is pulling of the second end of the second strap away from the first pulley block;
  - the second pulley block is having a second rachet, the second rachet is configured to switch between an engaged position and a disengaged position, in the engaged position, the second ratchet limits the movement of the second strap in one direction that is pulling of the second end of the second strap away from the first pulley block,
  - wherein the first ratchet and the second rather are by default biased in the engaged position,
  - each the first pulley block and the second pulley blocks having a clip which is actuable to disengage the first ratchet and the second ratchet respectively;
- engaging the second hook of the second strap to a first fastening point in a flatbed of a carrier vessel;
- disengaging the first ratchet and the second ratchet by actuating the clips of the first pulley block and the second pulley block;
- extending the first hook of the first strap up to a second fastening point in the flatbed, wherein the first fastening point and the second fastening point are on opposite sides of the cargo and the apparatus crossover the cargo;
- upon the first hook reaching near the second fastening point, releasing the first ratchet and the second ratchet;
- upon releasing the first ratchet and the second ratchet, hooking the first hook to the second fastening point; and
- upon hooking the first hook, pulling the second end of the second strap away from the first pulley block to tighten the apparatus over the cargo.

9. The method according to claim 8, wherein the second end of the second strap is configured as a handle.

10. The method according to claim 8, wherein the first pulley block is having two pulleys and the second pulley block is having two pulleys.

* * * * *